(12) United States Patent
Gonzalez

(10) Patent No.: US 8,747,041 B1
(45) Date of Patent: Jun. 10, 2014

(54) STRESS DISTRIBUTING THREADED FASTENER ASSEMBLY

(71) Applicant: Rene' G. Gonzalez, Southfield, MI (US)

(72) Inventor: Rene' G. Gonzalez, Southfield, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/850,608

(22) Filed: Mar. 26, 2013

(51) Int. Cl.
F16B 33/00 (2006.01)

(52) U.S. Cl.
USPC ........................................ 411/366.1; 411/436

(58) Field of Classification Search
USPC ............ 411/366.1, 432, 436, 917; 16/2.3–2.5
See application file for complete search history.

(56) References Cited

U.S. PATENT DOCUMENTS

| | | | | |
|---|---|---|---|---|
| 1,840,187 A * | 1/1932 | Lewis | ........................... | 403/343 |
| 1,920,141 A * | 7/1933 | Fischer | ........................ | 411/432 |
| 1,969,142 A * | 8/1934 | McIntyre | ...................... | 285/339 |
| 2,267,923 A * | 12/1941 | Johnson | ........................ | 285/334 |
| 2,333,290 A * | 11/1943 | Brackett | ....................... | 411/277 |
| 2,971,425 A * | 2/1961 | Blakeley | ........................ | 411/28 |
| 3,033,597 A * | 5/1962 | Miller | ............................ | 403/15 |
| 3,212,393 A * | 10/1965 | Waeltz | ........................ | 411/371.2 |
| 3,307,444 A * | 3/1967 | Money | ............................ | 411/28 |
| 3,443,474 A * | 5/1969 | Bergere et al. | ................... | 411/41 |
| 3,596,948 A * | 8/1971 | Spoehr | ....................... | 403/408.1 |
| 4,326,826 A * | 4/1982 | Bunyan | ......................... | 411/339 |
| 4,699,552 A * | 10/1987 | Jeal | .................................. | 411/43 |
| 5,279,407 A | 1/1994 | Shobak | | |
| 6,220,801 B1 * | 4/2001 | Lin | .................................... | 411/9 |
| 6,514,005 B2 * | 2/2003 | Shiokawa et al. | ......... | 403/408.1 |

OTHER PUBLICATIONS

Comet Kart Sales, Metric Brake Parts, Internet Article, 3 Pgs, 2002-2009.
Wikipedia, Lug Nut, Internet Article, 3 Pgs, Sep. 2012.
Nut design for increased fatigue resistance—2, Fasteners, Internet Article, 6 Pgs, Aug. 2011.
Notes on Nuts and Bolts, Internet Article, 6 Pgs, 2003.
Gary L. Kinzel, Reduction of Stress Concentration in Bolt-Nut Connectors, Journal of Mechanical Design, Nov. 2006, pp. 1337-1342, vol. 128, Ohio State University.

* cited by examiner

*Primary Examiner* — Roberta Delisle
(74) *Attorney, Agent, or Firm* — David L. Kuhn; Thomas W. Saur; Luis Miguel Acosta

(57) ABSTRACT

An improved nut-and-bolt assembly reduces tensile stress concentration on the bolt. The assembly has a specially designed nut with a tapered region extending from the nut crown and threaded with the first several bolt threads. The cross sectional area of the tapered region decreases linearly as a function of distance from the crown whereby the tapered region has a convex profile. Each of the bolt threads engaging the tapered region take up an approximately equal amount of longitudinal stress on the bolt.

9 Claims, 3 Drawing Sheets

US 8,747,041 B1

STRESS DISTRIBUTING THREADED FASTENER ASSEMBLY

GOVERNMENT INTEREST

The invention described here may be made, used and licensed by and for the U.S. Government for governmental purposes without paying royalty to me.

BACKGROUND OF THE INVENTION

1. Field of the Invention

The invention relates generally to fasteners and particularly relates to nut-and-bolt connections in articles or structures subjected to shock loads or subjected to severe conditions tending to fatigue fasteners.

2. Background Art

The invention teaches a fastener assembly where a specially designed tapered nut reduces concentration of longitudinal stress on bolt threads engaged with the nut. A relevant item of prior art is an article entitled "Reduction of Stress Concentration in Bolt-Nut Fasteners" by Srinan Venkatesan and Gary L. Kinzel published in the November 2006 issue of the *Journal of Mechanical Design*. That article discusses various modifications to nuts and bolts to reduce stress concentration on fastener threads. The most relevant modification is Model F shown in Table 1 of the article. Model F shows a bevel on the nut in conjunction with a groove on the end of the bolt; the article dismisses the Model F construction as unworthy of further study because a Model E, which has a notch on the nut as opposed to a bevel, was more effective. An article dealing generally with longitudinal stress on fastener threads is "Notes on Nuts and Bolts" at http://www.gizmology.netinuts/bolts.htm. Tapered nuts are commonly used in a fashion wherein the outer surface of the nut bears against a complimentary tapered seat or socket as seen for, example, in FIG. 6 of U.S. Pat. No. 5,279,407 to Shoback.

SUMMARY OF THE INVENTION

Taught herein is an improved fastener assembly for connecting structural elements together wherein tensile stress distribution is controlled to minimize failures of the assembly. The assembly has a fastener, such as a bolt, having a head and a threaded shank passing through the elements. Engaging the bolt is a specially designed nut having a crown and a tapered region threaded with several of the bolt threads, the tapered region extending from the crown toward one of the elements. The cross sectional area of the tapered region decreases linearly as a function of distance from the crown and the tapered region has a convex profile. The end of the tapered region distal from the crown is spaced from the elements and this end has a collar region with apertures to reduce the collar region's stiffness. Either a spacer or one of the structural elements surrounds and encloses the tapered region, and forms a radial gap therewith so that the outer diametrical surface of the tapered region is a free or nonbearing surface. Each of the bolt threads engaging the tapered region takes up an approximately equal amount of longitudinal stress on the bolt. This phenomenon differs from what occurs in conventional fastener arrangements wherein the first few bolt threads at the bolt-entry side of the nut take up the majority of the longitudinal stress.

DETAILED DESCRIPTION OF THE PREFERRED EMBODIMENT(S)

Definitions and Terminology

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial," "about" and "approximately," when used in reference to a quantity or amount of a material, dimension, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

Figure 1:
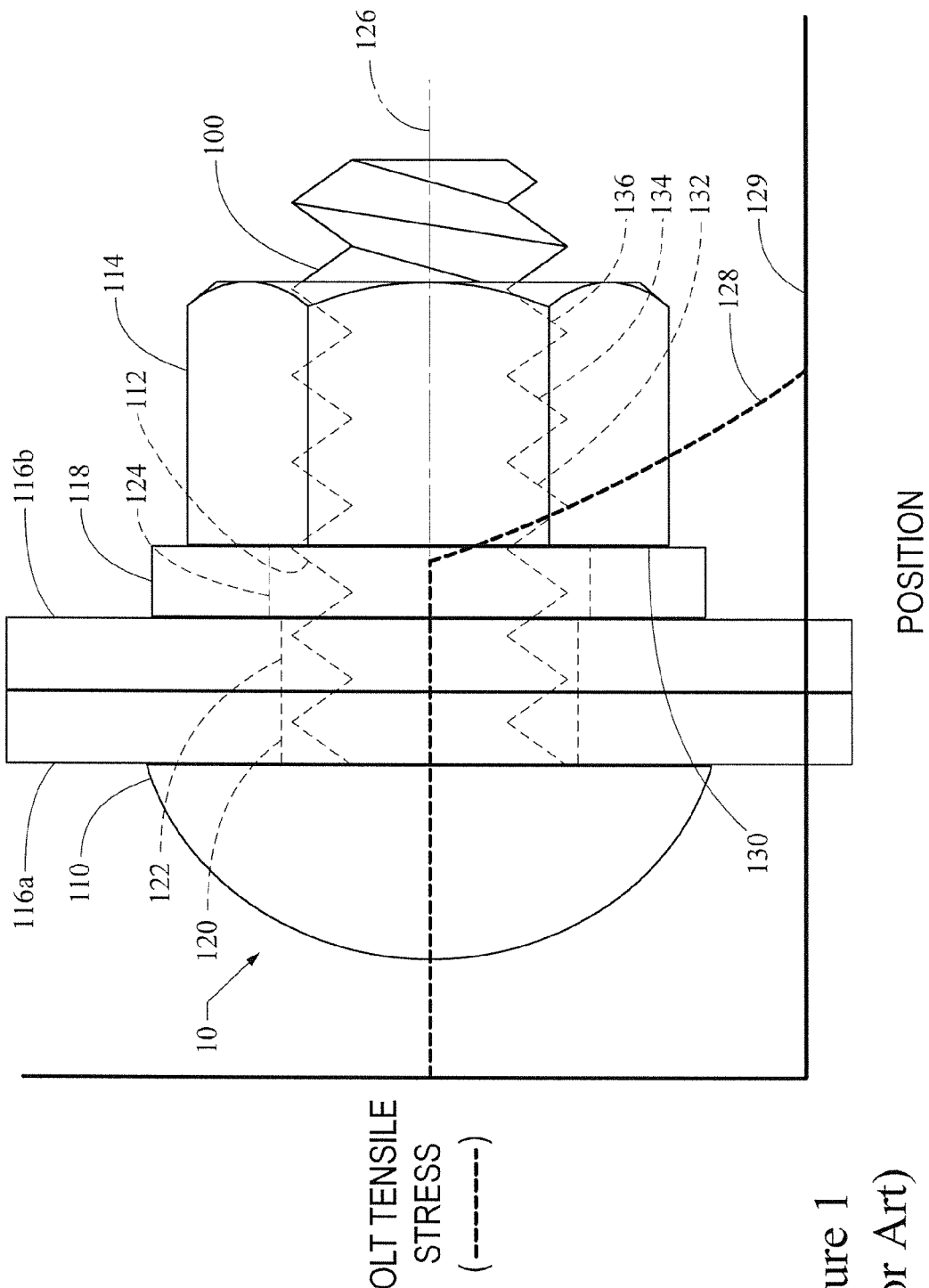
FIG. 1 is a depiction of s prior art arrangement of a nut-and-bolt assembly.

FIG. 1 shows a conventional fastening arrangement using a headed fastener such as bolt 100. Bolt 100 has a bolt head 110 and a threaded shank 112 which engages a standard internally threaded nut 114 so as to hold any two elements 116a and 116b together. Shank 112 can also be any threaded member such as a simple threaded rod. Head 110 can be replaced by any other component on shank 112 that axially bears against element 116a, such as a second nut or like fastening component. As is typical, a washer 118 is between nut 114 and element 116b. Element 116a, element 116b and 100 washer 118 define respective apertures 120, 122 and 124 whose diameter is greater than the outside diameter of shank 112. Superimposed on the depiction of assembly 10 is a nominal graph of axial or longitudinal stress on bolt 100 as a function of position along the bolt's longitudinal axis 126 about which bolt head 110 and shank 112 are centered. Note that the "Position" abscissa 129 in FIG. 1 does not represent zero values for longitudinal stress; but abscissa 129 does represent in conjunction with line 128 the stress value for a two-thread engagement between nut 114 and bolt 100.

Each point on graph line 128 indicates the stress level on bolt 100 at the position on shank 122 where the point is located. The stress level falls abruptly from left to right in FIG. 1, just after shank 112 passes through the entry side 130 of nut 114, which is the first part of the nut engaged by shank 112 as the nut is placed thereon. Typically the first thread 132 takes about one third of the stress, the second thread 134 takes about another one fourth of the stress and the third thread 136 takes about another one sixth of the stress. Typically, too, the first six threads together in a conventional nut-bolt connection take up about 98% of the bolt's longitudinal stress. The abrupt change in the stress just described creates a complex local stress state including elevated shear stresses which lead to local failure. Consequently bolt 100 tends to fail at the first few threads, such as threads 132, 134 and 136. If a nut-and-bolt assembly such as assembly 10 is used in a military vehicle, the assembly may be subjected to shock loads when explosions occur under or near the vehicle, or when the vehicle is struck by an incoming projectile. When bolt 100 fails at one of the first few threads due to these shock loads, nut 114 and the severed portion of the bolt are propelled away from element 116b, which in the case of a military vehicle could be the interior hull or wall panel of the vehicle crew compartment. Thus a bolt failure is a risk to the crew and contents of the vehicle.

In addition to the hazard of the nuts and bolt portions becoming projectiles, bolt 125 failures can lead to structural failures of vehicle components wherein, for example, critical blast shielding is no longer held in place or critical automotive functions of the vehicle are disabled. These failures can occur not only when the vehicle is impacted by explosions or projectiles but also can occur due to fatiguing of the bolt during normal operation of the vehicle.

Figure 2:
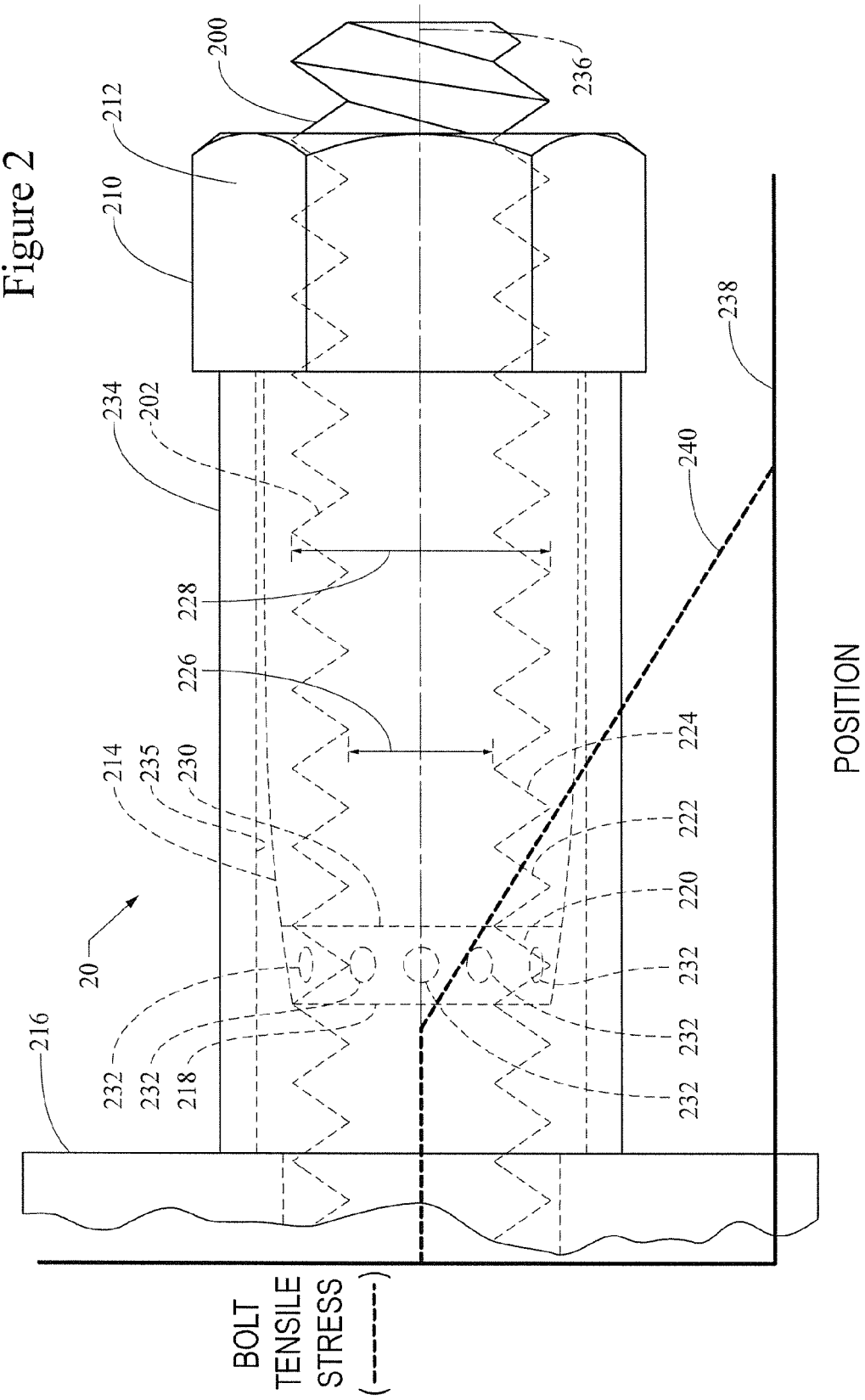
FIG. 2 depicts a first embodiment of my improved fastener assembly.

To avoid the foregoing hazard and failures, a nut-and-bolt assembly has been created in which the tensile stiffness of the nut is reduced where the bolt enters the nut. This assembly distributes the axial or longitudinal stress on the bolt more evenly over a greater number of threads and avoids an abrupt change in that longitudinal stress level. The improved assembly's design is shown generally as assembly 20 in FIG. 2, wherein a bolt 200 threads into a specially designed nut 210. It will be understood that bolt 200 has a conventional bolt head (not shown) similar to bolt head 110 in FIG. 1. Threaded shaft or shank 202 can be replaced by a simple threaded rod and the bolt head can be replaced by a second nut or a similar bearing, fastening element which functions as a bolt head. It will also be understood that assembly 20 is used to fasten any two elements 140 together, such as elements 116a and 116b shown in FIG. 1; however for convenience only one such element, designated as 216 in FIG. 2, is shown in connection with assembly 20.

Nut 210 has a polygonal region or crown 212 shaped similarly to a conventional nut and typically has a generally hexagonal cross sectional shape, but other crown shapes 145 can be employed. Extending from crown 212 is an elongate tapered region 214, "elongate" here meaning that the axial or longitudinal dimension of region 214 is greater than its largest outer diameter. Region 214 has its largest diameter where it joins crown 212 and has its smallest diameter at bolt receipt end 218, which is the part of region 214 most distal from crown region 212. End 218 is spaced from, and does not contact, 150 element 216, so that region 214 is free to stretch axially toward that element. Preferably the taper has a convex profile as shown in exaggerated fashion in FIG. 2 and preferably, but not necessarily, engages six or more threads. The threads at or near end 218 are designated as first distal thread 220, second distal thread 222 and third distal thread 224 wherein distal thread 220 is the most remote from crown 212, thread 222 is the next most distal, and so on.

The convex taper profile occurs because the cross sectional area of region 214 decreases linearly with, or in direct proportion to, a factor determined by two variables. The first variable is the difference in tensile stiffness or tensile modulus between the materials of the nut and bolt. The second variable is the distance from crown 212. In the case where the bolt 200 and nut 210 are of the same material, it is preferred that the cross sectional area of end 218 be 15% or less than the cross sectional area of the shank or threaded portion of bolt 200.

If bolt 200 has a greater or lesser tensile stiffness or tensile modulus than nut 210, the rate at which the cross sectional area of region 214 changes is still linear but is multiplied by a constant value representing the differential in tensile stiffness of the bolt and nut. For example, if the tensile stiffness of bolt 200 is three times as great as the nut, the cross sectional area of region 214 would be three times greater, and end 218 would preferably have a cross sectional of no more than 45% the cross sectional area of the shank or threaded portion of the bolt. But if the tensile stiffness of bolt were one-third that of nut 210, then the cross sectional area would be three times smaller, and end 218 would preferably have a cross sectional area of no more than 5% of the shank of bolt 200.

For purposes of comparing the cross sectional areas of region 214 and the shank of bolt 200, two different methods are contemplated, although other methods can be applied. The cross sectional areas used can be the minimum cross sectional areas of the bolt's shank and of the nut at a given distance from crown 212; these would be calculated using the minimum pitch diameter 226 of the shank and the maximum pitch diameter 228 of the nut. Alternately, the average cross sectional areas of the shank and nut can be used.

Tapered region 214 has a collar or collar zone 230 located at end 218, zone 230 typically having the same taper as the rest of region 214 but alternately having no taper, such that the outer diameter of zone 230 is parallel to the longitudinal axis 236 of nut 210. Zone 230 defines a plurality of either blind holes or through holes 232 about its circumference, these holes reducing the tensile stiffness of the zone. Holes 232 obviate the need to taper region 214 to a sharp edge at end 218, so that end 218 has a blunt edge whereby entry of bolt 200 into nut 210 is facilitated and nut 210 is safer to use.

A cylindrical spacer 234 is disposed between crown 212 and element 216, the spacer enclosing region 214 and enclosing the threaded portion of bolt 200 between end 218 and element 216. Spacer 234 preferably defines a radial gap with tapered region 214 so that the spacer does not support or reinforce tapered region 214, whereby the outer diametrical surface of region 214 is a free surface in the sense that it does not bear against another surface or contact other components. In particular region 214 does not contact a complimentarily tapered seat as is the case with some conventional lug nuts. Spacer 234 need not be cylindrical but it does need to have an internal bore 235 where tapered region 214 is located.

Similarly to FIG. 1, superimposed on the depiction of assembly 20 is a nominal graph of axial or longitudinal stress on bolt 200 as a function of position along the bolt's longitudinal axis 236 about which bolt 200 is centered. Note that the "Position" abscissa 238 in FIG. 2 does not represent zero values for longitudinal stress; but abscissa 238 does represent in conjunction with line 240 the stress value for a several-thread engagement between nut 210 and bolt 200. Each point on graph line 240 indicates the longitudinal stress level on bolt 200 at the position along axis 236 where the point is located. Typically each engaged thread, such as threads 220, 222 and 224, will take up an approximately equal percentage of the longitudinal stress. Preferably, under ideal thread mating conditions, the variation is no more than two percent between adjacent threads. However, the precise percentage of the longitudinal stress taken up by each thread will depend on details of construction that will vary for specific applications. Such details include, for example, the material of nut, 210, which can be different than the material of which bolt 200 is made. Other details include, without limitation, the maximum outer diameter of region 214, the size and shape of apertures 232, thread size, thread pitch and fit quality between the nut and bolt.

Figure 3:
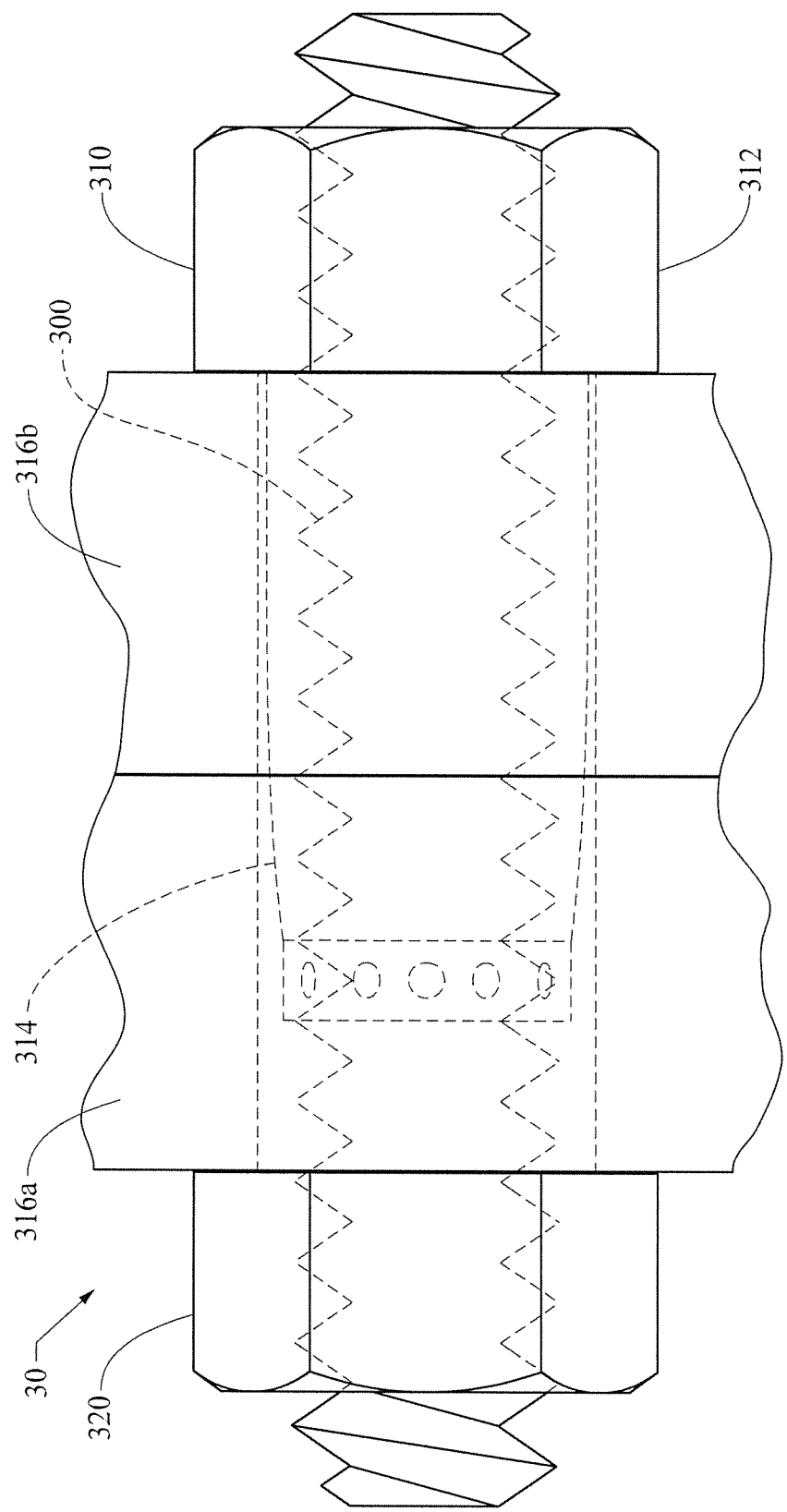
FIG. 3 depicts a second embodiment of my improved fastener assembly.

In FIG. 3 is shown an alternate arrangement for the new nut-and-bolt assembly, which is designated as reference numeral 30. Assembly 30 features a nut 310 which is identical to nut 210 in FIG. 2 except that the convex profile of the nut's tapered region 314 is not exaggerated for effect as is tapered region 214 in FIG. 2. However, region 314 does have a convex profile. Assembly 30 has a threaded rod or shank 300, as opposed to a bolt, engaged with nut 210. Instead of a bolt head, there is a second, conventional female threaded fastener such as standard nut 320. Clamped between nut 320 and crown 312 of nut 310 are two structural elements 316a and 316b, which can be walls, panels, plates, bracket arms or other component of an article of manufacture or a building. One of the structural elements can be replaced by a spacer element such as a washer or spacer 234 shown in FIG. 2.

It will be apparent to those skilled in the art without departing from the scope and spirit of this invention and it is understood this invention is limited only by the following claims.

What is claimed is:

1. An improved fastener assembly for holding elements together wherein tensile stress distribution is controlled, the assembly comprising:
    a shank through the elements;
    an axially bearing component on the shank contacting one of the elements;
    shank threads on the shank;
    a nut engaging the shank;
    a crown of the nut contacting another of the elements;
    an elongate tapered region of the nut threaded with the shank threads, the tapered region extending from the crown toward the axially bearing component wherein the tapered region has a convex profile;
    an end of the tapered region distal from the crown and spaced from the axially bearing component; and
    a collar region at the end of the tapered region, the collar region defining at least one hole;
    wherein an outer diametrical surface of the tapered region is a free surface.

2. The assembly of claim 1 wherein shank threads engaging the tapered region each take up an approximately equal amount of longitudinal stress on the shank.

3. The assembly of claim 1, wherein the cross sectional area of the tapered region decreases at a linear rate as a function of distance from the crown.

4. The assembly of claim 3 wherein the linear rate is multiplied by a factor determined by a difference in tensile stiffness between materials of which the nut and the shank are made.

5. An improved fastener assembly for holding elements together wherein tensile stress distribution is controlled, the assembly comprising:
    a shank through the elements to be held together;
    an axially bearing component on the shank contacting one of the elements;
    shank threads on the shank;
    a nut engaging the shank;
    a crown of the nut contacting another of the elements;
    an elongate tapered region of the nut threaded with the shank threads, the tapered region extending from the crown toward the axially bearing component wherein the tapered region has a convex profile;
    an end of the tapered region distal from the crown and spaced from the axially bearing component; and
    a collar region at the end of the tapered region, the collar region defining at least one hole to reduce stiffness of the collar region;
    wherein an outer diametrical surface of the tapered region is a free surface and wherein shank threads engaging the tapered region each take up an approximately equal amount of longitudinal stress on the shank and;
    wherein the cross sectional area of the tapered region decreases linearly as a function of distance from the crown.

6. The assembly of claim 5 wherein the tapered region engages at least six of the shank threads.

7. An improved assembly for connecting elements together wherein tensile stress distribution is controlled to minimize failures of the assembly, the assembly comprising:
    a fastener having a head and a shank passing through the elements;
    fastener threads on the shank;
    a nut engaging the fastener;
    a crown of the nut;
    a tapered region of the nut threaded with at least six of the fastener threads, the tapered region extending from the crown toward one of the elements;
    wherein the cross sectional area of the tapered region decreases linearly as a function of a factor having two variables, a first variable being a distance from the crown and the a second variable being a difference in tensile stiffness between the fastener and the nut;
    an end of the tapered region distal from the crown and spaced from the elements;
    a collar region at the end of the tapered region defining at least one hole therein;
    a spacer between the crown and the elements, the spacer surrounding and enclosing the tapered region of the nut;
    wherein the spacer forms a radial gap with the tapered region and an outer diametrical surface of the tapered region is a free surface;
    wherein each of the bolt threads engaging the tapered region take up an approximately equal amount of longitudinal stress on the bolt.

8. The assembly of claim 7 wherein in the end of the tapered region has a blunt edge.

9. The assembly of claim 7 wherein the cross sectional area of the end is determined by a product of the second variable and a value not exceeding 15% of the cross sectional area of the shank.

* * * * *